(12) United States Patent
Russalian

(10) Patent No.: US 11,326,696 B2
(45) Date of Patent: May 10, 2022

(54) SEAL FOR COOLANT CONTROL VALVE

(71) Applicant: Schaeffler Technologies AG & Co. KG, Herzogenaurach (DE)

(72) Inventor: Vigel Russalian, Macomb, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 566 days.

(21) Appl. No.: 15/632,941

(22) Filed: Jun. 26, 2017

(65) Prior Publication Data

US 2018/0372224 A1    Dec. 27, 2018

(51) Int. Cl.
| | |
|---|---|
| *F16J 15/3296* | (2016.01) |
| *F16J 15/52* | (2006.01) |
| *F16K 5/20* | (2006.01) |
| *F16K 11/087* | (2006.01) |
| *F16K 5/06* | (2006.01) |
| *F01L 7/16* | (2006.01) |
| *F01L 13/00* | (2006.01) |

(52) U.S. Cl.
CPC ......... *F16J 15/3296* (2013.01); *F16J 15/525* (2013.01); *F16K 5/0678* (2013.01); *F16K 5/202* (2013.01); *F16K 11/0873* (2013.01); *F01L 7/16* (2013.01); *F01L 13/0042* (2013.01)

(58) Field of Classification Search
CPC .. F01L 13/0042; F01L 7/16; F01L 3/08; F16J 15/3296; F16J 15/525; F16J 15/545; F16J 15/00; F16J 15/3212; F16K 11/0873; F16K 5/0678; F16K 5/202; F16K 11/0704; F16K 5/0689
See application file for complete search history.

(56) References Cited

U.S. PATENT DOCUMENTS

| | | | | |
|---|---|---|---|---|
| 1,481,562 A | * | 1/1924 | Rowe .................. | F01L 3/08 123/188.6 |
| 3,554,562 A | * | 1/1971 | Davis, Jr. ........... | F01L 3/08 277/502 |
| 3,625,525 A | * | 12/1971 | Davis, Jr. ........... | F01L 3/08 277/502 |

(Continued)

FOREIGN PATENT DOCUMENTS

| | | |
|---|---|---|
| EP | 2469110 A1 | 6/2012 |
| EP | 3312395 A1 | 4/2018 |

(Continued)

*Primary Examiner* — Lindsay M Low
*Assistant Examiner* — Ruben Picon-Feliciano
(74) *Attorney, Agent, or Firm* — Matthew V. Evans

(57) ABSTRACT

A rotary valve seal for a coolant control valve is provided that offers improved sealing with a rotary valve body. The rotary valve seal includes a central axis, a cylindrical seal body, and a seal skeleton. The cylindrical seal body has a first stiffness and a first end that is configured with a radially outwardly extending flange. The seal skeleton, having a second stiffness and embedded within the cylindrical seal body, has a plurality of fingers circumferentially arranged within the flange. The second stiffness can be greater than the first stiffness. The plurality of fingers and flange can define alternating stiffness zones. The first end of the seal body and the flange define a bottom surface configured for sealing engagement with a rotary valve body. The rotary valve body can be shaped in the form of at least one spherical segment.

20 Claims, 7 Drawing Sheets

(56) References Cited

U.S. PATENT DOCUMENTS

| | | | | |
|---|---|---|---|---|
| 4,257,575 | A | * | 3/1981 | Runyan .................. F16K 5/061 |
| | | | | 251/292 |
| 4,778,148 | A | | 10/1988 | Kruger |
| 5,558,056 | A | * | 9/1996 | Sakata ...................... F01L 3/08 |
| | | | | 123/188.6 |
| 9,341,273 | B2 | | 5/2016 | Grabau |
| 9,500,106 | B2 | * | 11/2016 | Pawl ......................... F01L 3/08 |
| 2011/0133109 | A1 | | 6/2011 | Mircea |
| 2011/0140369 | A1 | | 6/2011 | Lenhert |
| 2015/0184761 | A1 | | 7/2015 | Kusakabe |
| 2016/0109031 | A1 | | 4/2016 | Greene |
| 2016/0319943 | A1 | | 11/2016 | Morein |
| 2017/0167614 | A1 | * | 6/2017 | Baumann ............... F16J 15/004 |
| 2018/0073420 | A1 | * | 3/2018 | Arbel ................. G05D 23/1333 |
| 2018/0119836 | A1 | * | 5/2018 | Ozeki ................ F16K 11/0856 |

FOREIGN PATENT DOCUMENTS

| | | |
|---|---|---|
| JP | 2015231671 A | 12/2015 |
| KR | 101628127 B1 | 6/2016 |

* cited by examiner

SEAL FOR COOLANT CONTROL VALVE

TECHNICAL FIELD

Example aspects described herein relate to coolant control valves for use within fluid cooling systems of vehicular powertrains.

BACKGROUND

As fuel economy becomes paramount in the transportation industry, efforts have increased to achieve higher internal combustion (IC) engine efficiencies and to seek alternative powertrains. Coolant control valves (CCVs) are well known and can be arranged to provide coolant flow control for temperature management of various vehicular powertrain components including internal combustion engines, transmissions and various components of hybrid electric and fuel cell vehicles.

A portion of coolant valves are electro-mechanical in design, incorporating an actuator assembly that interfaces with a mechanical rotary valve body to provide a controlled flow of coolant to a selected powertrain component or system. An electric motor, controlled by the engine control unit, is often employed within the actuator assembly of the electro-mechanical rotary valve to achieve any desired angular position of the rotary valve body. A transmission or gear train can be utilized between the electric motor and rotary valve body.

Injection molded plastic components are often utilized within CCV assemblies to fulfill complex geometries while minimizing component weight and internal fluid flow path friction. Material properties of plastic are much different than that of metals, however, but can be managed for use within IC engines.

One significant challenge for any vehicular powertrain component is withstanding a constant influx of particle contamination. For coolant system components, sources of particle contamination can include any component through which coolant flows or the coolant itself. Particle contamination can prevent a CCV from achieving its design targets for flow and leakage. A sealed interface between an inlet or outlet port and the rotary valve body exists to ensure proper function and performance of the CCV. Any reduction in sealing at this interface is detrimental, therefore, particle contamination counter-measures are required for a long, functional life of a CCV.

SUMMARY OF THE INVENTION

A rotary valve seal for a coolant control valve is provided that offers improved sealing with a rotary valve body. The rotary valve seal includes a central axis, a cylindrical seal body, and a seal skeleton. The cylindrical seal body has a first stiffness and a first end that is configured with a radially outwardly extending flange. The seal skeleton, having a second stiffness and embedded within the cylindrical seal body, has a plurality of fingers circumferentially arranged within the flange. The second stiffness can be greater than the first stiffness. The plurality of fingers and flange can define alternating stiffness zones. The first end of the seal body and the flange define a bottom surface configured for sealing engagement with a rotary valve body. The rotary valve body can be shaped in the form of at least one spherical segment.

BRIEF DESCRIPTION OF DRAWINGS

The above mentioned and other features and advantages of the embodiments described herein, and the manner of attaining them, will become apparent and better understood by reference to the following descriptions of multiple example embodiments in conjunction with the accompanying drawings. A brief description of the drawings now follows.

DETAILED DESCRIPTION OF THE EMBODIMENTS

Figure 1:
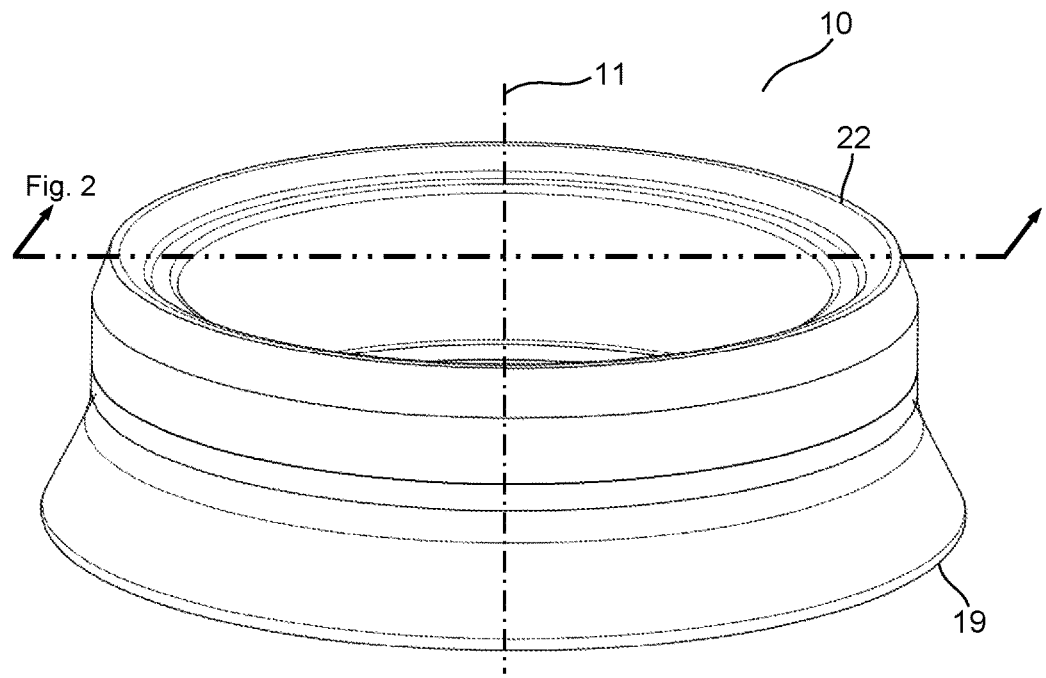
FIG. 1 is a perspective view of an example embodiment of a rotary valve seal.

Identically labeled elements appearing in different figures refer to the same elements but may not be referenced in the description for all figures. The exemplification set out herein illustrates at least one embodiment, in at least one form, and such exemplification is not to be construed as limiting the scope of the claims in any manner. Certain terminology is used in the following description for convenience only and is not limiting. The words "inner," "outer," "inwardly," and "outwardly" refer to directions towards and away from the parts referenced in the drawings. Axially refers to directions along a diametric central axis. Radially refers to directions that are perpendicular to the central axis. The words "left" and "right" designate directions in the drawings to which reference is made. The terminology includes the words specifically noted above, derivatives thereof, and words of similar import.

Figure 8:
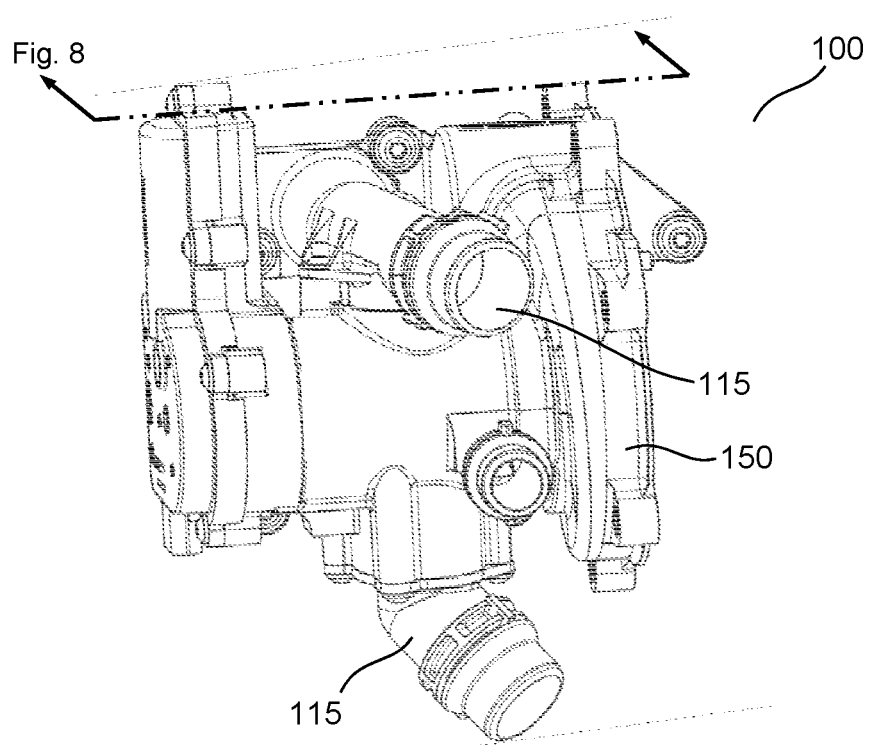
FIG. 8 is a perspective view of a prior art coolant control valve (CCV).
Figure 9:
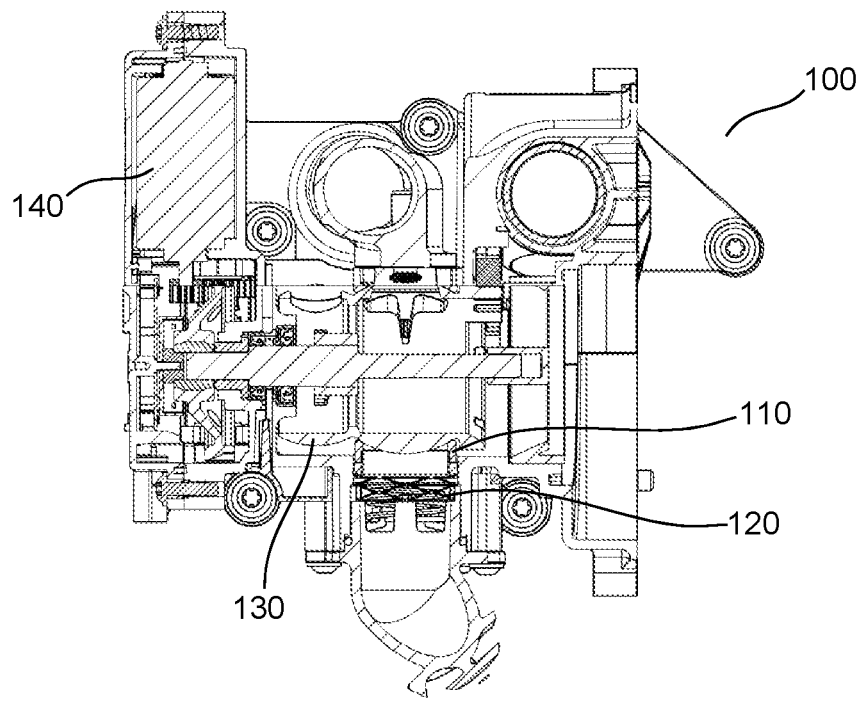
FIG. 9 is a cross-sectional view taken from FIG. 8, revealing a rotary valve body and rotary valve seal.
Figure 10:
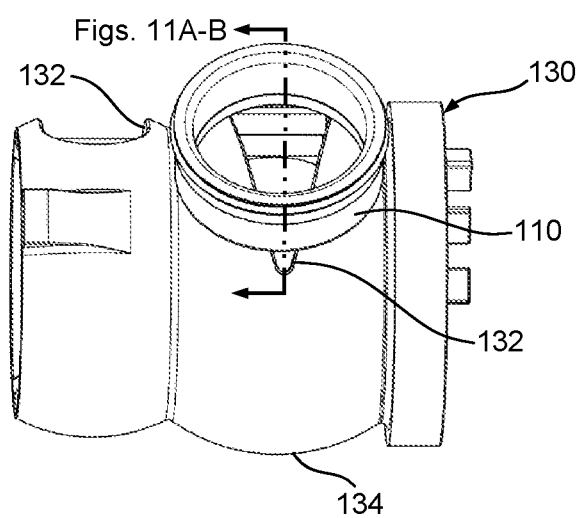
FIG. 10 is a perspective view of the rotary valve body and rotary valve seal of FIG. 9.
Figure 11A:
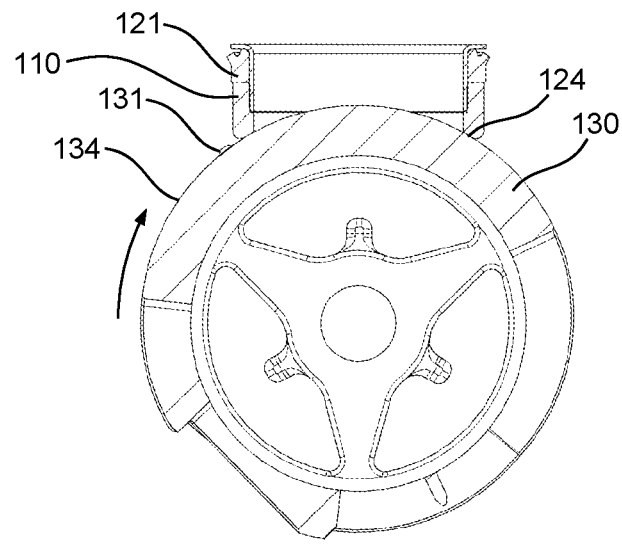
FIGS. 11A-B are cross-sectional views taken from FIG. 10.
Figure 11B:
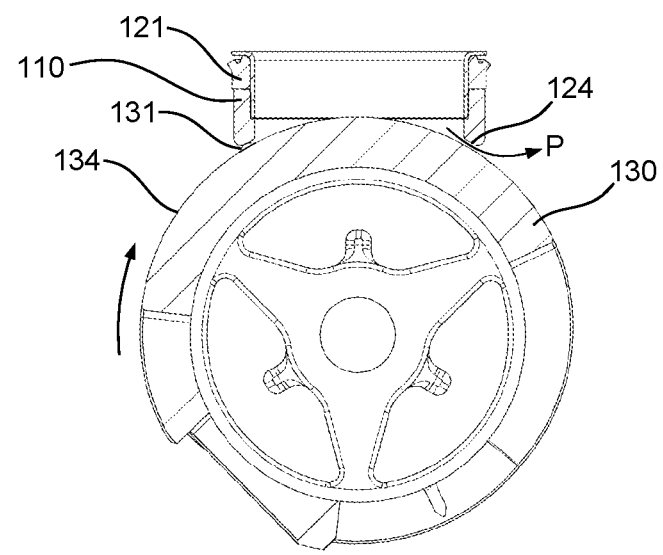

Referring to FIG. 8, a parametric view of a prior art coolant control valve (CCV) 100 is shown. FIG. 9 shows a cross-sectional view taken from FIG. 8, revealing a rotary valve body 130 that is actuated by an actuator 140, and a seal 110. FIG. 10 shows an isometric view of the rotary valve 130 and seal 110 of FIG. 9; and, FIGS. 11A-B are cross-sectional views taken from FIG. 10. The following description should be read in light of FIGS. 8 through 11B. The CCV 100 has a plurality of coolant flow ports 115 that can serve as either inlet or outlet ports to or from various powertrain components (or various sections or elements within a powertrain component), such as an internal combustion (IC) engine. Corresponding to the plurality of ports 115 are fluid openings 132 arranged within the rotary valve body 130. Critical to the function of the CCV 100 is proper management of coolant flows to and from the ports 115, many times requiring stoppage of flow to a certain port. The seal 110 can be configured within each port 115 to sealingly engage an outer surface 134 of the rotary valve body 130 to ensure accurate coolant flow management. A secondary seal 121 can be optionally arranged adjacent to the seal 110 to provide further sealing of the port to an outer housing 150 of the CCV 100. A force generating device 120 is another optional component that can serve to forcibly act upon the seal 110 to improve its sealing against the outer surface 134 of the rotary valve body 130.

Now referring to FIGS. 11A-B, cross-sectional views taken from FIG. 10 are shown in two rotational rotary valve positions. A particle contaminant 131 is shown on the outer surface 134 of the rotary valve body 130. The particle contaminant 131 can take many forms, including dirt, sand, metallic or non-metallic fragments, and coolant deposits. The particle contamination 131 can be lodged on the outer surface 134 of the plastic rotary valve body 130 or floating freely within the coolant flowing through the CCV 100.

In FIG. 11A, the rotary valve body 130 is in a first rotational position at which the particle contaminant 131 is approaching the seal 110 as the rotary valve body 130 rotates clockwise. In this position, a bottom surface 124 of the seal 110 is sealingly engaged with the outer surface 134 of the rotary valve body 130, preventing coolant leakage.

In FIG. 11B, the rotary valve body 130 is in a second rotational position at which the particle contaminant 131 displaces the seal 110 away from the outer surface 134 of the rotary valve body 130. In this second rotational position, the bottom surface 124 of the seal 110 is not engaged with the outer surface 134 of the rotary valve body 130, providing an unwanted pathway P for coolant to flow.

Figure 2:
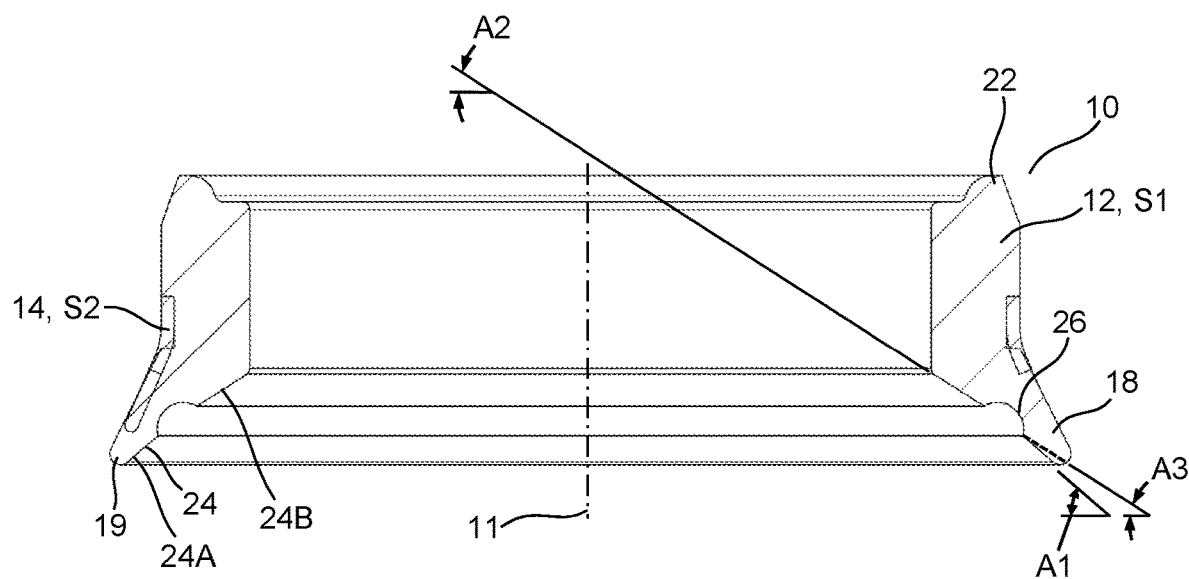
FIG. 2 is a cross-sectional view taken from FIG. 1, revealing a seal body and a seal skeleton.
Figure 3:
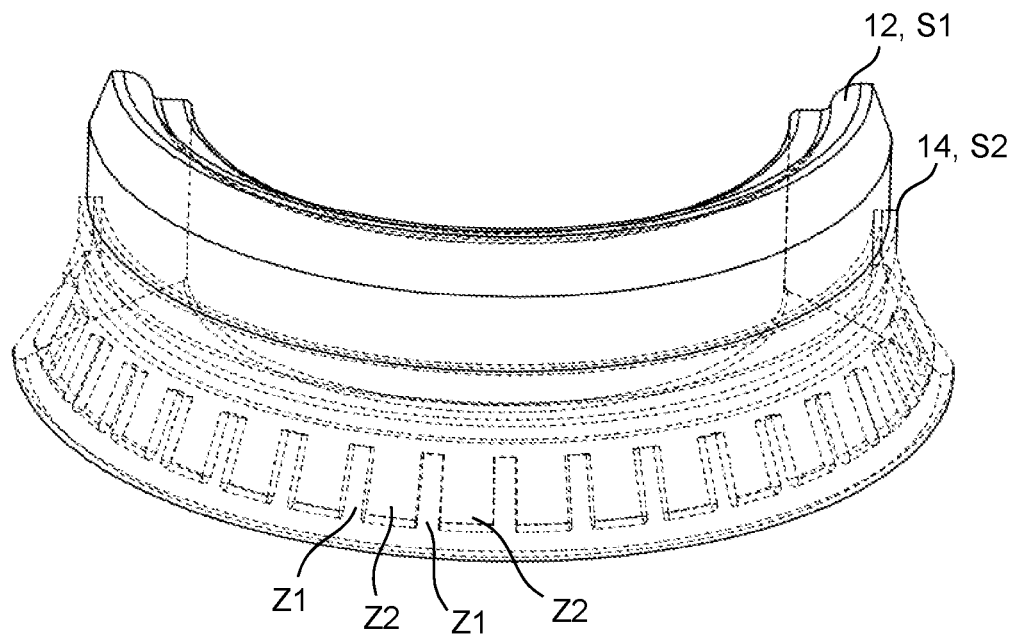
FIG. 3 is a partial perspective view of FIG. 1, with broken lines showing the seal body revealed in FIG. 2 for clarity purposes.
Figure 4A:
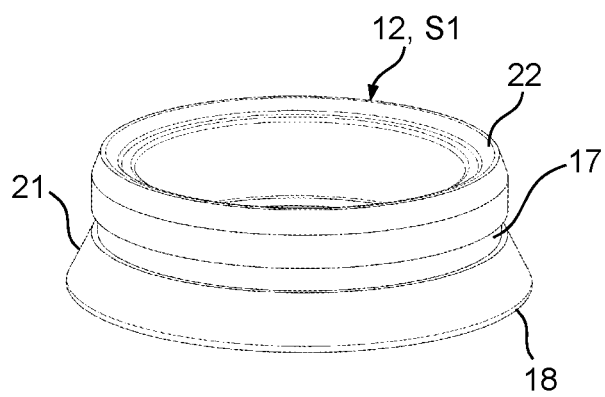
FIG. 4A is a perspective view of the seal body of FIG. 2.
Figure 4B:
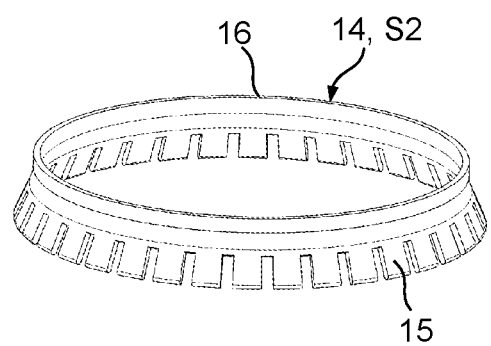
FIG. 4B is a perspective view of the skeleton of FIG. 2.

Now referring to FIG. 1, a parametric view of an example embodiment of a rotary valve seal 10 is shown that offers a countermeasure for particle contaminants that could be encountered in a cooling system. FIG. 2 shows a cross-sectional view taken from FIG. 1. FIG. 3 shows a partial parametric view of the rotary valve seal 10 with broken lines added for clarity purposes, and FIGS. 4A and 4B provide parametric views of the components of the rotary valve seal 10. The following description should be viewed in light of FIGS. 1 through 4B. The rotary valve seal 10 includes a central axis 11 and a seal skeleton 14 that is at least partially embedded within a cylindrical seal body 12. The cylindrical seal body 12 has a first stiffness S1, and a first end 19 configured with a radially outwardly extending flange 18. The seal skeleton 14 has a second stiffness S2, and a plurality of fingers 15 circumferentially arranged within the flange 18 of the cylindrical seal body 12. The fingers 15 are embedded within the flange 18 of the cylindrical seal body 12 such that alternating circumferential stiffness zones Z1, Z2 reside throughout the flange 18, as shown in FIG. 3. The first stiffness zone Z1 resides between the fingers 15, while the second stiffness zone Z2 resides at the individual finger 15 locations. The seal skeleton 14 can be constructed of many different materials, including metal and plastic materials. As shown in FIG. 2, the seal skeleton 14 can be arranged in a radial outer portion 21 of the seal body 12, however, any radial location could be possible to satisfy the function of the seal skeleton 14 within the seal body 12. The seal skeleton 14 can be configured with a top lip 16 that extends through a medial portion 17 of the seal body 12. Any portion of the seal skeleton 14 can be exposed outside of the cylindrical seal body 12; alternatively stated, any portion of the seal skeleton 14 may be visible such that it is not completely encompassed by the seal body 12. The seal body 12 can be constructed of many different materials including metal, plastic, rubber, or an elastomer. Assuming the use of plastic, the seal skeleton 14 can be overmolded within the cylindrical seal body 12 by an injection mold process. Alternatively, the seal skeleton 14 can be manually inserted within the seal body 12, facilitated by openings or slots (not shown) to receive the seal skeleton 14 within the seal body 12.

Figure 5:
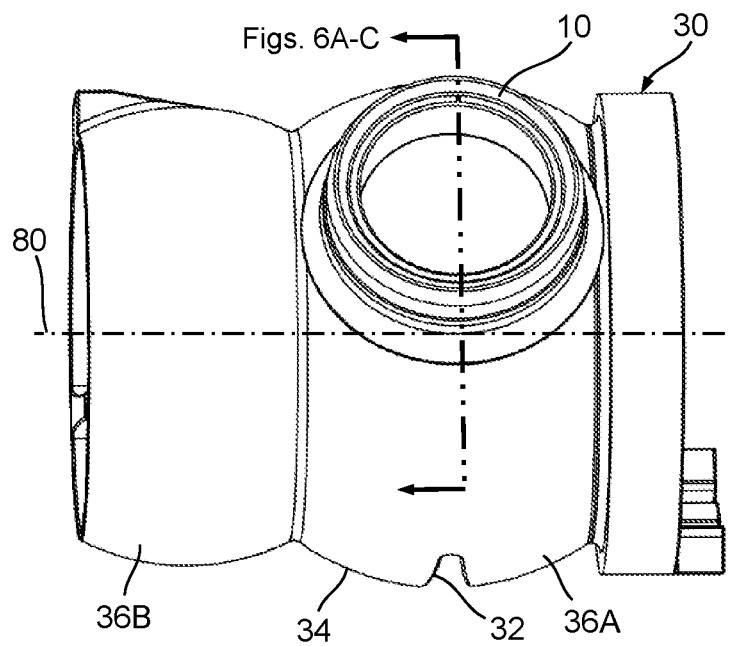
FIG. 5 is a perspective view of the rotary valve seal of FIG. 1 together with a rotary valve body.

Referring now to FIG. 5, the rotary valve seal 10 of a port (not shown) is engaged with an outer surface 34 of a first lobe 36A of a rotary valve body 30 that also includes a second lobe 36B. The outer surface 34 of the first lobe 36A defines a spherical segment; other forms to facilitate the function of a rotary valve body 30 are also possible. A fluid opening 32 is arranged within the first lobe 36A such that rotation of the rotary valve body 30 about a rotational axis 80 changes the position of the fluid opening 32 relative to the rotary valve seal 10. Any overlap between the fluid opening 32 and rotary valve seal 10 facilitates fluid flow between the port and rotary valve body 30. An increase in overlap typically increases fluid flow.

Figure 7:
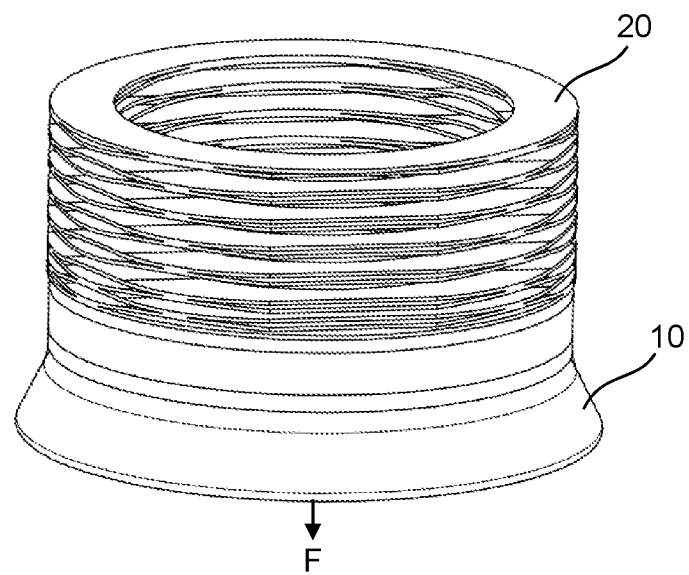
FIG. 7 is a perspective view of the rotary valve seal of FIG. 1 together with a force generating device.

In order to provide precise fluid flow control, leakage between the rotary valve seal 10 and rotary valve body 30 should be minimized at all operating conditions that could include large temperature fluctuations and the presence of particle contamination. Referring to FIG. 2, the first end 19 of the rotary valve seal 10 is configured with a bottom surface 24 to engage the outer surface 34 of the rotary valve body 30. The bottom surface 24 could have a geometry or form that is different than what is shown in the figures. Material selections for the seal body 12 and skeleton 14 could provide for an elastic property of the flange 18, improving the integrity of a seal formed by the bottom surface 24 and the outer surface 34 of the first lobe 36A of the rotary valve body 30. For example, a spring steel could be utilized for the material of the seal skeleton 14. A further enhancement to improve elasticity of the flange 18 could be provided in the form of a relief 26 that separates the bottom surface 24 into a first segment 24A and a second segment 24B. More than one relief 26 and more than two segments could also be possible. In a first uninstalled or free state, the first segment 24A could have a first angle A1 that is different than a second angle A2 of the second segment 24B; furthermore, the first angle A1 could be larger than the second angle A2 of the second segment while in the first uninstalled state. Upon installation of the rotary valve seal 10 within a coolant control valve (CCV), an optional force generating device 20 shown in FIG. 7, could be arranged to forcibly engage the second end 22 of the rotary valve seal 10. With a downward force F applied to the rotary valve seal 10, the bottom surface 24 forcibly engages the outer surface 34 of the rotary valve body 30; the first end 19 could deflect radially outward as the first segment 24A engages the outer surface 34 of the rotary valve body 30, shown by the broken line in FIG. 2. Therefore, in a second installed state, the first segment 24A could have a third deflected angle A3 that is less than the first uninstalled angle A1.

Figure 6A:
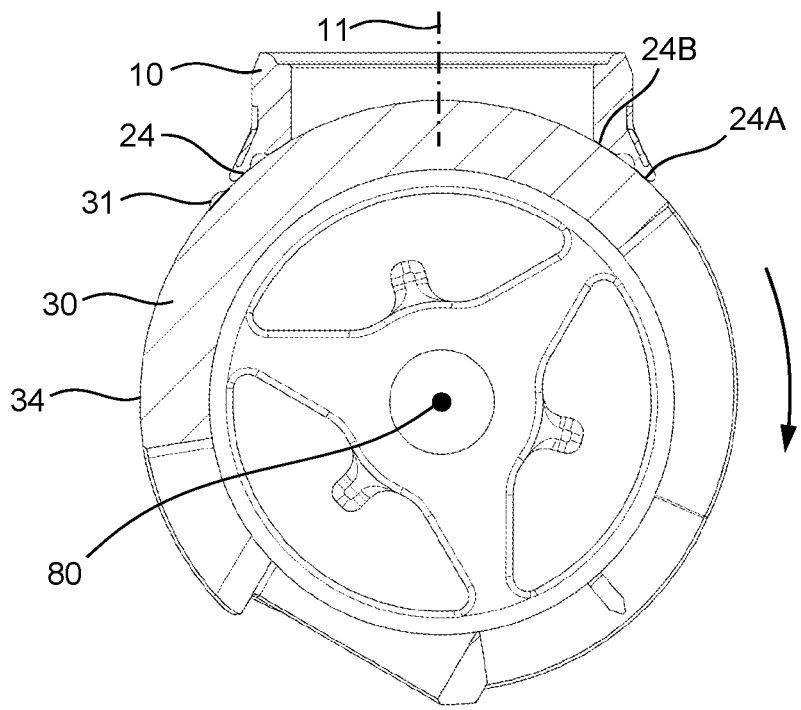
FIGS. 6A-C are cross-sectional views taken from FIG. 5.
Figure 6B:
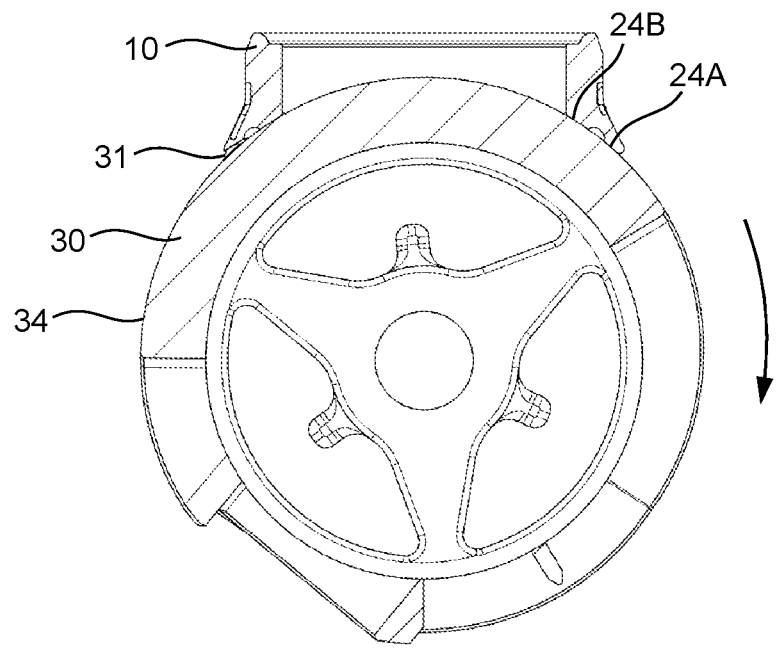
Figure 6C:
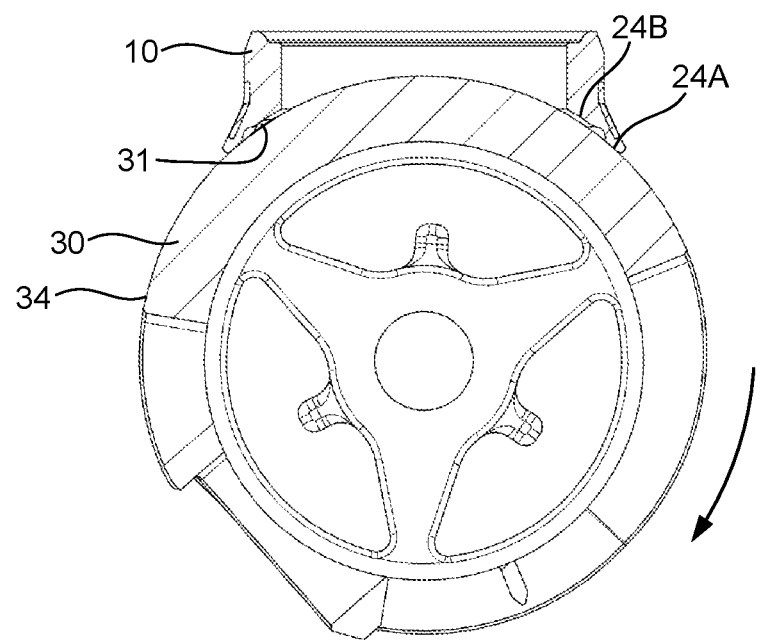

FIGS. 6A through 6C, which show the rotary valve seal 10 in the second installed state, further exemplify advantages of the rotary valve seal when encountering a particle contaminant 31 or abnormality that is present on the outer surface 34 of the rotary valve body 30. FIG. 6A shows the particle contaminant 31 approaching the rotary valve seal 10 as the rotary valve body 30 rotates clockwise; in this rotary position it does not engage or interfere with the bottom surface 24 of the rotary valve seal 10; therefore, continuous circumferential engagement of the first segment 24A and the second segment 24B with the outer surface 34 of the rotary valve body is achieved.

FIG. 6B shows the rotary valve body 30 rotated further clockwise than the orientation of FIG. 6A, resulting in the particle contaminant 31 penetrating the first segment 24A of the bottom surface 24 of the rotary valve seal 10. Two important details that relate to favorable attributes of this example embodiment of the rotary valve seal 10 include: 1). The presence of the particle contaminant 31 between the first segment 24A and the outer surface 34 of the rotary valve body 30 does not cause disengagement of the second segment 24B from the outer surface 34 of the rotary valve body 30, and, therefore, fluid leakage does not occur between the second segment 24B and the outer surface 34; and, 2). Even though the particle contaminant 31 causes the first segment 24A of the bottom surface 24 to disengage or separate from the outer surface 34 of the rotary valve body 30, this disengagement is localized to only a portion of the circumferential first segment 24A due to: A). The configuration of the flange 18 of the cylindrical seal body 12 providing alternating stiffness zones Z1, Z2 (see FIG. 3); and, B). The elastic nature of the flange 18.

FIG. 6C shows the rotary valve body 30 rotated further clockwise than the orientation of FIG. 6B, resulting in the particle contaminant 31 penetrating the second segment 24B of the bottom surface 24 of the rotary valve seal 10. The presence of the particle contaminant 31 between the second segment 24B and the outer surface 34 of the rotary valve body 30 causes disengagement of the second segment 24B from the outer surface 34; however, circumferential engagement of the first segment 24A with the outer surface 34 remains intact, due to the elastic characteristic of the flange 18 of the rotary valve seal 10, preventing unwanted fluid leakage between the bottom surface 24 and outer surface 34.

In the foregoing description, example embodiments are described. The specification and drawings are accordingly to be regarded in an illustrative rather than in a restrictive sense. It will, however, be evident that various modifications and changes may be made thereto, without departing from the broader spirit and scope of the present invention.

In addition, it should be understood that the figures illustrated in the attachments, which highlight the functionality and advantages of the example embodiments, are presented for example purposes only. The architecture or construction of example embodiments described herein is sufficiently flexible and configurable, such that it may be utilized (and navigated) in ways other than that shown in the accompanying figures.

Although example embodiments have been described herein, many additional modifications and variations would be apparent to those skilled in the art. It is therefore to be understood that this invention may be practiced otherwise than as specifically described. Thus, the present example embodiments should be considered in all respects as illustrative and not restrictive.

What I claim is:

1. A rotary valve seal for a coolant control valve, the rotary valve seal comprising:
    a central axis;
    a cylindrical seal body having:
        a first end configured with a radially outwardly extending flange; and,
        a first stiffness; and,
    a seal skeleton at least partially embedded within the cylindrical seal body, the seal skeleton having:
        a plurality of fingers circumferentially arranged within the flange; and,
        a second stiffness different than the first stiffness; and,
    the first end of the seal body and the flange define a bottom surface configured for sealing engagement with a rotary valve body; and the plurality of fingers and flange define alternating stiffness zones.

2. The rotary valve seal of claim 1, wherein the rotary valve body is shaped in a form of at least one spherical segment.

3. The rotary valve seal of claim 1, wherein the second stiffness is greater than the first stiffness.

4. The rotary valve seal of claim 1, wherein the seal skeleton is constructed from metal.

5. The rotary valve seal of claim 4, wherein the seal skeleton is constructed from spring steel.

6. The rotary valve seal of claim 1, wherein the seal body is constructed from plastic.

7. The rotary valve seal of claim 6, wherein the seal body is injection molded.

8. The rotary valve seal of claim 7, wherein the seal skeleton is overmolded by the seal body.

9. The rotary valve seal of claim 1, wherein the seal body is constructed from an elastomer.

10. The rotary valve seal of claim 1, wherein the seal skeleton further comprises a top lip extending through a medial portion of the seal body.

11. The rotary valve seal of claim 1, wherein a second end of the cylindrical seal body is engaged with a spring, the spring configured to provide a force along a longitudinal axis of the cylindrical seal body, and the second end arranged opposite the first end.

12. The rotary valve seal of claim 1, wherein the skeleton is arranged in a radial outward portion of the cylindrical seal body.

13. The rotary valve seal of claim 1, wherein at least a portion of the bottom surface is angled.

14. The rotary valve seal of claim 13, wherein the bottom surface further comprises at least one relief that separates the bottom surface into at least two segments.

15. The rotary valve seal of claim 14, wherein the bottom surface comprises a first relief that separates the bottom surface into a first segment and a second segment.

16. The rotary valve seal of claim 15, wherein a first angle of the first segment is different than a second angle of the second segment.

17. The rotary valve seal of claim 15 having:
    a first uninstalled state with the first segment having a first angle and the second segment having a second angle; and
    a second sealed state with the bottom surface sealingly engaged with the rotary valve body, with the first segment having a third angle less than the first angle.

18. The rotary valve seal of claim 1, wherein the bottom surface is configured to overlap with a fluid opening of the rotary valve body to manage fluid flow within the coolant control valve.

19. A rotary valve seal for a coolant control valve, the rotary valve seal comprising:
    a central axis;
    a cylindrical seal body having:
        a first end configured with a radially outwardly extending flange; and,
        a first stiffness; and,
    a seal skeleton at least partially embedded within the cylindrical seal body, the seal skeleton having:
        a plurality of circumferentially spaced fingers arranged within the flange; and,
        a second stiffness different than the first stiffness; and,
        the flange configured for direct sealing engagement with a rotary valve body.

20. A rotary valve seal for a coolant control valve, the rotary valve seal comprising:
- a central axis;
- a cylindrical seal body having:
  - a first end configured with a radially outwardly extending flange; and,
  - a first stiffness; and,
- a seal skeleton at least partially embedded within the cylindrical seal body, the seal skeleton having:
  - a plurality of fingers extending longitudinally within the flange; and,
  - a second stiffness different than the first stiffness; and,
  - the flange configured for direct sealing engagement with a rotary valve body.

* * * * *